Feb. 7, 1967

K. IKRATH 3,302,746

SELF-EXCITED SEISMIC SYSTEMS

Filed March 4, 1964

INVENTOR.
KURT IKRATH.

ATTORNEYS

United States Patent Office 3,302,746
Patented Feb. 7, 1967

3,302,746
SELF-EXCITED SEISMIC SYSTEMS
Kurt Ikrath, Elberon, N.J., assignor to the United States of America as represented by the Secretary of the Army
Filed Mar. 4, 1964, Ser. No. 349,505
10 Claims. (Cl. 181—.5)

The invention described herein may be manufactured and used by or for the Government for governmental purposes without the payment of any royalty thereon.

The present invention relates to self-excited seismic systems and more particularly to novel and useful seismic oscillators which include a feedback loop having both an electrical portion and a seismic portion. Such an oscillator is capable of generating sinusoidal seismic waves without the application of any external signal source and hence has been termed a self-excited seismic system. Briefly stated, such a system includes a pair of tuned seismic transducers both resting on the earth in the same vicinity. One of the transducers is operated as a transmitter, that is it converts electrical signals to seismic waves and the other as a receiver which converts seismic waves back to electrical signals. By connecting an amplifier and a phase shifter between the output of the receiver transducer and the input of the transmitter transducer, the amplified and phase shifted output of the receiver can supply the input to the transmitter transducer, thus producing oscillation or self-excitation. In a modified embodiment the gain of the amplifier in the electrical part of the loop is periodically varied over such a range as to bring the apparatus periodically into and out of oscillation. In this condition the apparatus functions as a highly sensitive and selective superregenerative detector of external seismic waves which reach the receiver transducer.

It is therefore an object of the present invention to provide novel and useful self-excited seismic systems.

It is a further object of this invention to provide a source of continuous or pulsed sinusoidal seismic waves which requires no alternating current signal source.

Another object of this invention is to provide a sensitive detector for seismic waves.

A further object of this invention is to provide a superregenerative detector of seismic waves.

A still further object of the invention is to provide an oscillator in which part of the feedback loop is electrical and part seismic.

It is another object of this invention to provide a seismic communication system comprising a self-excited seismic transmitter and a superregenerative seismic receiver.

These and other objects and advantages of the invention will become apparent from the following detailed description and drawing, in which.

Figure 1:
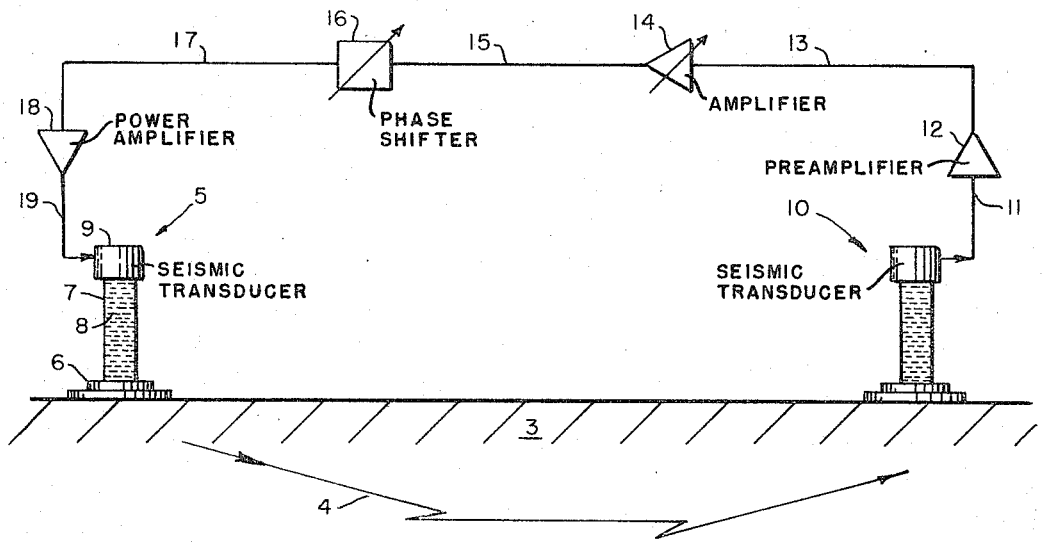
FIG. 1 is a circuit diagram of a self-excited seismic system which can produce either continuous sinusoidal waves or pulsed sinusoidal waves.

In FIG. 1 there is shown a tuned seismic transmitter transducer 5 and tuned seismic receiver transducer 10 both resting on the earth 3 a short distance apart. The output of receiver transducer 10 is connected to preamplifier 12 via lead 11 which in turn is connected to variable gain amplifier 14 via lead 13. The output of amplifier 14 is connected to variable phase shifter 16 via lead 15, the output of which is in turn connected to the input of power amplifier 18 via lead 17. The output of power amplifier 18 is connected to the input of transmitter transducer 5. The electrical signal applied to the transmitter transducer 5 is thereby converted to a seismic wave 4 and travels through the earth to the receiver transducer where it is converted back to an electrical signal which is then amplified and phase shifted by the electrical circuitry already described and reapplied to the transmitter 5. At certain settings of loop gain and phase shift, continuous sinusoidal oscillation or self-excitation will take place. The frequency of oscillation will fall somewhere within the passband of the two tuned transducers 5 and 10, the exact frequency depending on the adjustments of the phase shifter 16 and variable gain amplifier 14. In order for oscillation to take place, the total phase shift around the loop, both the electrical and seismic portions thereof, must be an integral multiple of 360 degrees. Suppose, for example, that the spacing of the two transducers is such that there is one-half a wavelength between the transmitter and receiver. Thus there is a phase difference of 180° between the two transducers. In order for oscillation to take place the total phase shift in the electrical portion of the loop must then be 180°, since under these conditions the output of the receiver transducer will be supplying the input to the transmitter in proper phase to sustain oscillation. In operation, the phase shifter 16 and amplifier 14 are varied or adjusted until oscillation takes place. The total gain of the amplifiers 12, 14, and 18 must be sufficient to overcome or supply all of the losses of the circuit, including the losses in the seismic portion of the loop. Once oscillation starts, slight changes in the frequency thereof can be made by varying the phase shifter 16 and/or the gain of amplifier 14. The amount of such frequency change depends on the bandwidth of the two tuned transducers 5 and 10, since the oscillation frequency must fall somewhere within the passband of the transducers.

The transmitter transducer 5 of FIG. 1 comprises a disc shaped metallic base 6 on which is mounted a steel cylindrical sleeve 7. The sleeve 7 contains a plurality of circumferential slots 8. Mounted atop the sleeve 7 is the electrical driver unit 9 which is similar to the voice coil and magnet assembly of a loudspeaker. The magnet assembly is supported by a rod (not shown) mounted on base 6 and within the sleeve 7. The coil is attached to the upper end of the sleeve 7 and is mounted for movement within the magnetic field produced by the magnet assembly. The slotted sleeve 7 is the equivalent to a stiff spring and acts as a mechanical impedance matcher or transformer for matching the impedance of electrical driver 9 to the impedance of the earth. A perfect match will be obtained only over a narrow band of frequencies and odd harmonics thereof, hence the device is frequency sensitive and for this reason has been termed a tuned seismic transducer. If the fundamental frequency thereof is made in the vicinity of 50–100 c.p.s., the circuit of FIG. 1 will oscillate only at the fundamental frequency, since the earth attenuation at the third harmonic and higher will be too large to permit oscillation at any frequency except the fundamental.

It can be seen that such a transducer can be used both as a seismic transmitter or a seismic receiver and hence transducer 10 will be of the same structure as transducer 3. In operation as a transmitter, an A.C. electrical signal is applied to the coil which transmits a mechanical wave down the sleeve 7 and thence to the earth as a seismic wave. Conversely, if the coil of such a transducer is connected to the input of an amplifier, any seismic waves impinging on the base 6 will be transmitted up through the sleeve 7 to cause movement of the coil which generates a corresponding voltage. A more detailed description of such a transducer will be found in an article co-authored by the present inventor in the magazine "Electronics" of April 12, 1963, on pages 51–55.

The apparatus of FIG. 1 has numerous uses. It may be used as a generator of seismic waves for making geophysical studies, as a transmitter in a seismic communications system, or as a seismic surveillance system. In the geophysical field, the apparatus of FIG. 1 may be used to study the velocity of seismic waves in a given area. The transit time or velocity of the seismic wave 4 between the two transducers determines the relative phase difference between the input to the transmitter 5 and the output of the receiver 10 and hence any change in seismic velocity will result in a change in the frequency of oscillation of the overall system. Therefore, by monitoring or recording the oscillation frequency, an indication of seismic velocity changes will be obtained. These velocity recordings are valuable in predicting the nature and composition of subsurface strata. The apparatus of FIG. 1 can also be utilized as a surveillance system. The two transducers may be placed on opposite sides of an area to be kept under surveillance. Any changes in loading on the earth's surface between the two transducers, caused for example by a hostile surface vehicle, will change the earth density slightly and result in a slight change in oscillation frequency. For increased sensitivity in this application, the phase shifter 16 and amplifier 14 may be adjusted so that oscillation barely takes place. A change in surface loading in one sense will then stop oscillation. Also, if the circuit is adjusted so that it is just ready to break into oscillation, a change in surface loading in the opposite sense will start the oscillation. The starting or stopping of oscillation may then sound an alarm. In the case where the intruder starts the oscillation, the resultant seismic wave may be transmitted to and detected at a remote receiver station. By placing several pairs of these oscillators in different areas and tuning each pair of to a slightly different frequency, a single receiver station could simultaneously monitor all of the oscillation frequencies and could thus protect a much larger area and could pinpoint the intruder by the frequency of the received seismic wave. If each pair of oscillators is tuned to the same frequency, the starting of oscillation of any one of them would set off all the others in chain-reaction fashion. This would result in a more sensitive system. Such oscillators will remain oscillating indefinitely once started and it would be necessary to reset them by stopping the oscillation momentarily after the intruder leaves. This can be done by opening a switch in the electrical portion of the loop or by gradually charging a capacitor with the rectified oscillation voltage and using the capacitor voltage to automatically quench the oscillation.

Figure 2:
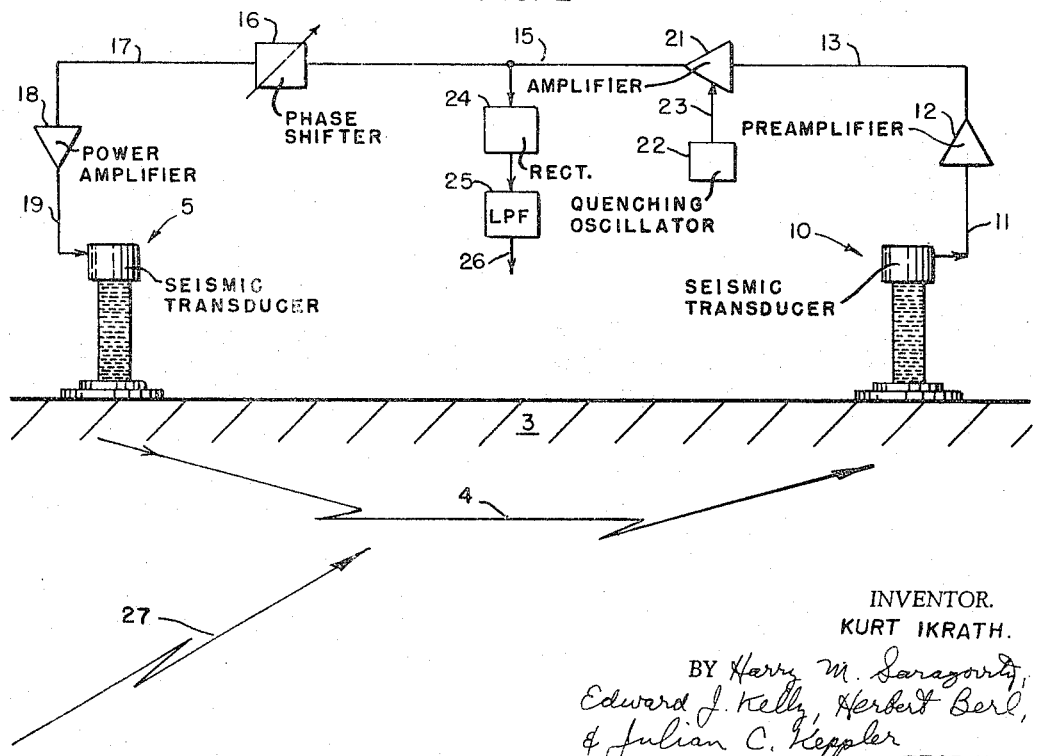
FIG. 2 is a circuit diagram of a self-excited seismic system which is arranged as a sensitive seismic superregenerative receiver.

In the field of seismic communications, the circuit of FIG. 1 may be used to transmit seismic waves to a remote receiver, for example the receiver of FIG. 2. Intelligence may be transmitted by either keying the oscillation on and off in accordance with a code or by frequency or amplitude modulation. Keying may be accomplished by opening any portion of the electrical part of the loop. Alternatively, the phase shifter 16 may be rapidly shifted in phase by 180°. Thus changes the feedback around the loop from positive to negative and therefore causes a rapid damping of the oscillator which results in sharp pulses of alternating current. In order to key the circuit back on, the phase is shifted another 180°.

Although the electrical portion of the loop of FIG. 1 is shown as including three separate amplifiers 12, 14 and 18, it would be possible to combine all of these into a single variable gain amplifier of greater gain than amplifier 14 and of sufficient power output to drive the transducer 5 directly.

FIG. 2 illustrates how the circuit of FIG. 1 may be modified to form a seismic superregenerative receiver. In FIG. 2, elements the same as those of FIG. 1 bear the same reference numbers and perform the same function. In place of the manually variable gain amplifier 14 of FIG. 1, the circuit of FIG. 2 includes an amplifier 21 the gain of which is periodically varied by means of quenching oscillator 22. The output of oscillator 22 is applied to the control input of amplifier 21 via lead 23. Voltages applied to the control input of amplifier 21 will vary the gain thereof in proportion to the magnitude of the applied voltage. For example, the quenching oscillator 22 may provide a sawtooth waveform comprising a positive going ramp portion which gradually rises to a maximum voltage and then abruptly drops to a minimum. The loop gain and the amplitude of the sawtooth output of 22 are chosen so that at the beginning of the sawtooth cycle or at the bottom of the ramp, the gain of amplifier 21 is too low to sustain oscillation around the loop comprising the two transducers 5 and 10, the amplifiers 12, 21 and 18 and phase shifter 16. However, as the gain of amplifier 21 is linearly increased by the sawtooth output of 22, a point will be reached where the circuit will break into oscillation, and the oscillation will continue until the end of the sawtooth cycle. If the quenching oscillator is made substantially lower in frequency than the seismic oscillator, the waveform of the seismic oscillator will comprise a series of sinusoidal waves which are interrupted or pulsed at the quenching frequency. If an external seismic wave, for example, wave 27, having a frequency the same as that of the seismic oscillator should arrive from a remote point and be picked up by receiver transducer 10, it will be amplified and circulated around the oscillator loop. The result will be that the externally received seismic waves will cause the oscillation to start earlier in each quenching period than it would in the absence of such externally received wave and further, the stronger the externally received wave, the earlier the oscillations will start. Thus the length of time or the percentage of the quenching period during which the circuit is oscillating is a function of the amplitude of the externally received seismic wave. By rectifying and filtering the signal in the electrical portion of the oscillator loop it is possible to recover any amplitude modulation which is carried by the seismic wave 27. This detection is accomplished by rectifier 24 and low pass filter 25. Low pass filter 25 has a cutoff frequency below the frequency of the seismic oscillator and below the quenching frequency but above the frequency of the modulation on the seismic wave 27. Thus the quenching frequency must be intermediate the seismic oscillation frequency and the highest modulation frequency. The modulation appears at the output of filter 25 at lead 26. While the quenching waveform has been stated to be a sawtooth, other waveforms may be used, the only requirement being that the quenching oscillator periodically start and stop the oscillations of the seismic oscillator.

It can be seen that the operation of the circuit of FIG. 2 is analogous to that of a superregenerative radio receiver, and it has all of the advantages thereof, including extreme sensitivity and selectivity. The high selectivity enables the seismic receiver to discriminate sharply against undesired noise and other extraneous seismic signals which differ only slightly in frequency from a desired received wave. Also, it is apparent that the circuits of FIGS. 1 and 2 may be cooperatively used as a seismic transmitter-receiver combination, either for communications purposes for making geophysical studies, or for surveillance purposes.

While the invention has been described in connection with illustrative embodiments, it is possible that many variations thereof will occur to those skilled in the art without departing from the inventive concepts disclosed herein, accordingly the invention should be limited only by the scope of the appended claims.

What is claimed is:

1. A self-excited seismic system comprising a tuned seismic transmitter transducer and a tuned seismic receiver transducer resting on the earth a short distance apart, a variable gain amplifier and a variable phase shifter connected in cascade between the output of said receiver transducer and the input of said transmitter transducer, said phase shifter and amplifier being adjusted so that the phase shifted and amplified output of said receiver transducer supplies the input to said transmitter transducer, thus producing sinusoidal oscillation.

2. The apparatus of claim 1 in which the fundamental frequency of said tuned transducers falls in the vicinity of 50 to 100 cycles per second.

3. A seismic oscillator comprising an electrical-seismic loop including a tuned seismic transmitter transducer and a tuned seismic receiver transducer located on the earth in the same vicinity, a preamplifier connected to the output of said receiver transducer, a variable gain amplifier connected to the output of said preamplifier, a variable phase shifter connected to the output of said variable gain amplifier, a power amplifier connected between the output of said variable phase shifter and the input of said transmitter transducer, the gain of said amplifiers being sufficient to supply all the losses of the circuit and the phase shifter being adjusted to produce a total phase shift of 360° around said electrical-seismic loop.

4. A superregenerative seismic receiver comprising a pair of tuned seismic transducers resting on the earth in the same vicinity, an amplifier and a variable phase shifter connected in cascade between said pair of transducers, means to periodically vary the gain of said amplifier over such a range that said receiver periodically starts and stops oscillating, and means connected to the output of said amplifier to detect the percentage of the time during which said receiver oscillates.

5. A superregenerative seismic receiver comprising a pair of tuned seismic transducers resting on the earth in the same vicinity, a preamplifier, a variable gain amplifier, a variable phase shifter and a power amplifier connected in cascade between said pair of transducers, a quenching oscillator connected to a control input of said variable gain amplifier, sand quenching oscillator arranged to periodically vary the gain of said variable gain amplifier over such a range that said receiver periodically starts and stops oscillating at the fundamental frequency of said tuned transducers, and detector means connected to the output of said variable gain amplifier.

6. A superregenerative seismic receiver comprising an electrical-seismic loop, said loop comprising a tuned seismic transmitter transducer and a tuned seismic receiver transducer located on the earth in the same vicinity; a preamplifier, an amplifier, a variable phase shifter and a power amplifier connected in cascade between the output of said receiver transducer and the input of said transmitter transducer said preamplifier, amplifier, phase shifter and power amplifier comprising the electrical portion of said loop, a quenching oscillator connected to said amplifier and arranged to periodically vary the gain thereof over such a range that said receiver periodically starts and stops oscillating at the fundamental frequency of said tuned transducers, the frequency of said quenching oscillator being substantially less than said fundamental frequency, and means connected to said electrical portion of said electric-seismic loop to detect the percentage of the time during which said receiver oscillates.

7. A seismic communication system comprising a seismic transmitter and a superregenerative seismic receiver, said seismic transmitter comprising a first pair of tuned seismic transducers resting on the earth in the same vicinity, a variable gain amplifier and a variable phase shifter connected between said first pair of tuner transducers, means to vary the phase shifter in steps of 180° in response to a code to be transmitted through the earth to a remote vicinity, said superregenerative receiver comprising a second pair of tuned transducers resting on the earth at said remote vicinity, an amplifier and a variable phase shifter connected between said second pair of tuned transducers, a quenching oscillator connected to said amplifier and arranged to periodically vary the gain of said amplifier over such a range as to cause said superregenerative seismic receiver to periodically start and stop oscillating, the fundamental frequency of all four of said tuned seismic transducers being the same and the quenching frequency being substantially less than said fundamental frequency, and detector means connected to the output of said amplifier for determining the percentage of the time during which said receiver oscillates.

8. A seismic communication system comprising a seismic transmitter and a seismic superregenerative seismic receiver, said seismic transmitter comprising a first pair of tuned seismic transducers resting on the earth in the same vicinity, a variable gain amplifier and a variable phase shifter connected between said first pair of tuned transducers, said variable gain amplifier and variable phase shifter being adjusted to produce oscillation at the fundamental frequency of said first pair of tuned transducers; said superregenerative receiver comprising a second pair of tuned transducers resting on the earth at a remote vicinity, an amplifier and a variable phase shifter connected between said second pair of transducers, means connected to said amplifier to periodically vary the gain thereof over such a range as to periodically bring said receiver into and out of oscillation, and detector means connected to the output of said amplifier for measuring the percentage of the time during which said receiver oscillates.

9. A seismic surveillance system comprising a seismic oscillator, said seismic oscillator comprising a tuned seismic transmitter transducer and a tuned seismic receiver transducer resting on the earth at opposite sides of an area to be protected, a variable gain amplifier and a variable phase shifter connected in cascade between the output of said receiver transducer and the input of said transmitter transducer, said phase shifter and amplifier being adjusted so that said seismic oscillator is just ready to break into oscillation, whereby a change in surface loading in said area to be protected will start oscillation.

10. A seismic surveillance system comprising a seismic oscillator, said seismic oscillator comprising a tuned seismic transmitter transducer and a tuned seismic receiver transducer resting on the earth at opposite sides of an area to be protected, a variable gain amplifier and a variable phase shifter connected in cascade between the output of said receiver transducer and the input of said transmitter transducer, said phase shifter and amplifier being adjusted so that said seismic oscillator just barely oscillates, whereby any change in surface loading in said area to be protected will stop oscillation.

References Cited by the Examiner

UNITED STATES PATENTS

| | | |
|---|---|---|
| 2,688,124 | 8/1954 | Doty et al. |
| 2,723,387 | 11/1955 | Slavin et al. _____ 340—15.5 |
| 3,031,644 | 4/1962 | Hisserich et al. ____ 340—258 X |
| 3,103,655 | 9/1963 | Jones _____ 340—258 |
| 3,220,503 | 11/1965 | Oakley _____ 181—0.5 |
| 3,222,664 | 12/1965 | Premack _____ 340—258 |
| 3,278,893 | 10/1966 | Silverman _____ 181—0.5 X |

BENJAMIN A. BORCHELT, *Primary Examiner.*

SAMUEL FEINBERG, *Examiner.*

M. F. HUBLER, *Assistant Examiner.*